May 21, 1935.  E. G. WEAVER  2,002,424
CASTING REEL
Filed Oct. 20, 1932
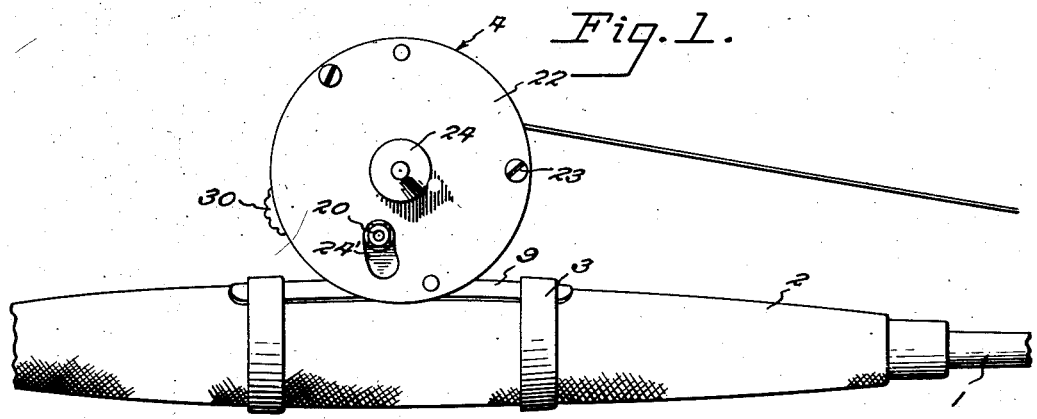
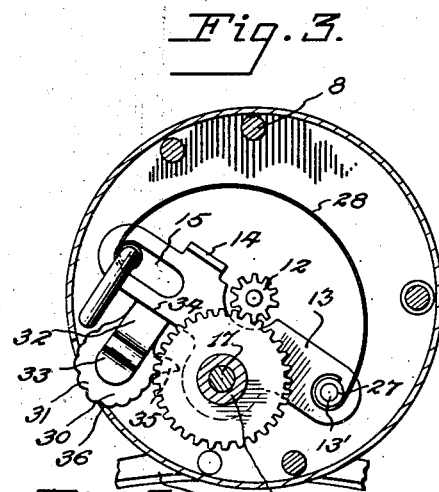
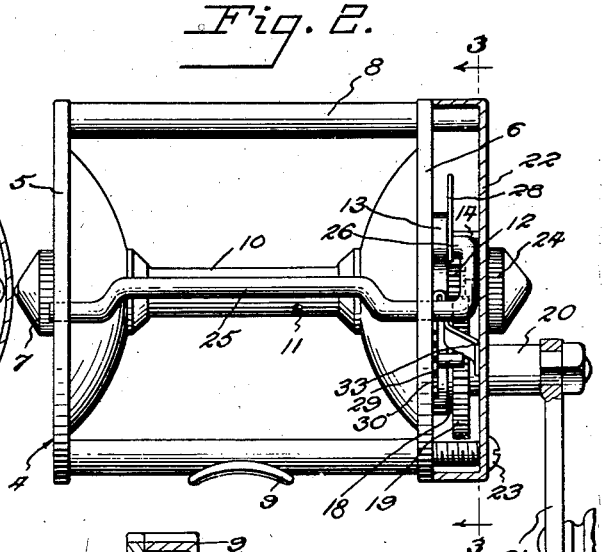
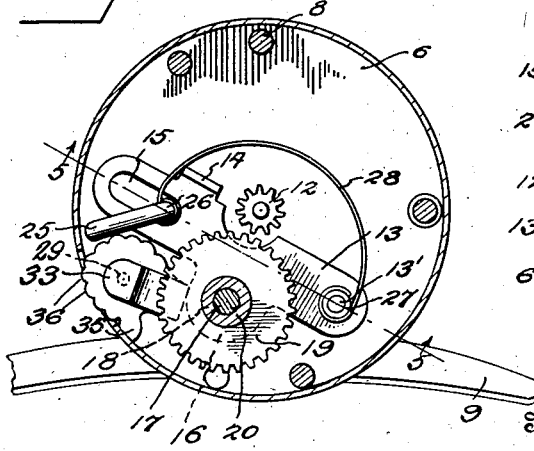
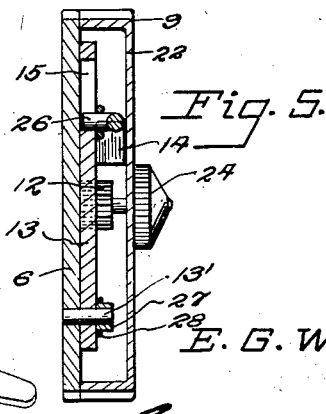
Inventor
E. G. Weaver
By Lacey & Lacey, Attorneys Patented May 21, 1935

2,002,424

UNITED STATES PATENT OFFICE 2,002,424

CASTING REEL

Edward G. Weaver, Butte, Mont.

Application October 20, 1932, Serial No. 638,809

7 Claims. (Cl. 242—84.7)

This invention relates to an improved casting reel and seeks, among other objects, to provide a device of this character wherein the spool employed may be thrown out of gear when the device is cast so that said spool may rotate freely with respect to the handle.

Another object of the invention is to provide a casting reel wherein means are provided for automatically connecting the spool to the handle after the line has been cast.

And a further object of the invention is to provide a casting reel having a lock which will, when in locked position, retain the spool in connection with the handle.

Other and incidental objects of the invention, not specifically mentioned in the foregoing, will be apparent during the course of the following description.

In the drawing forming a part of this application,

Figure 1 is a side elevation showing my improved reel in position on the handle of a fishing rod, Figure 2 is a vertical sectional view of the complete device, Figure 3 is a transverse sectional view of the device taken on the line 3—3 of Figure 2 looking in the direction indicated by the arrows and showing the device with the spool pinion employed locked in mesh with the handle gear employed, Figure 4 is a transverse sectional view of the device as it would appear with the spool disconnected from and freely rotatable with respect to the handle gear, and Figure 5 is a vertical sectional view taken on the line 5—5 of Figure 4 looking in the direction indicated by the arrows.

Referring now more particularly to the accompanying drawing, the numeral 1 indicates a fishing rod, which may be of any preferred style, and carried on one end of the fishing rod is the conventional handle 2. Fitting about the handle 2 are spaced sleeves or collars 3.

In carrying my invention into effect, I embody a reel frame which is indicated in general by the numeral 4 and is provided with end walls 5 and 6. Carried on the end wall 5 is a bearing 7. Connecting the end walls of the reel frame are legs 8 and mounted on a pair of adjacent legs is a mounting plate 9, the opposite ends of which are normally carried beneath the collars 3. Rotatable within the reel frame 4 is a spool 10 having one end journaled in the bearing 7 and the other end projecting through the end wall 6.

The spool 10 is provided with an opening 11 to receive the end of a conventional fishing line. Mounted on the projecting end of the spool 10 is a pinion 12.

Overlying the end wall 6 is a plate 13 which is elongated in shape and is preferably formed of a lightweight metal. The plate 13 is mounted on a pivot 13' so that swinging movement thereof over the surface of the wall 6 will be permitted. Formed on one side of the plate 13, near one end thereof, is an upstanding lug 14 and formed in said end of the plate 13, near said lug, is an elongated slot 15. As best seen in Figures 3 and 4 of the drawing, the plate is cut away medially to provide a space for the pinion 12. Formed on the opposite side of the plate 13, near the opposite end thereof, is a projection 16 and mounted on said projection is an upstanding stub shaft 17 which is reduced throughout the major portion of its length and is provided near its lower end with an enlarged portion defining a shoulder 18. Rotatably mounted on the stub shaft 17 and having its lower face in engagement with the shoulder 18 is a gear 19 having an integral sleeve 20 provided with a threaded portion to receive a handle 21. The gear 19 will, of course, normally be in mesh with the pinion 12. Overlying the end wall 6 in spaced relation thereto and overlying the plate 13 and gear 19 is a cover 22 which is preferably held in place by screws 23 and, as best seen in Figure 2 of the drawing, certain of the legs 8 are reduced and extended and have their free ends anchored in the cover 22. Carried on the cover 22, axially thereof, is a bearing 24 which journals the end of the spool shaft. The lug 14 of the plate 13 engages the cover 22 and provides a medial support for said cover, the lug 14 also cooperating with the under surface of the cover 22 for maintaining the plate 13 in flat engagement with the end wall 6. It will be understood, of course, that the sleeve 20 of the gear 19 extends through the cover 22 and is freely rotatable with respect thereto, and the opening in said cover 22 to receive said sleeve is elongated at 24'.

Associated with the reel frame 4 and extending between the end walls 5 and 6 is a one-piece crank 25 having one end thereof journaled by the end wall 5 near the periphery thereof and the other end journaled by the wall 6. The crank is projected through the wall 6 and is bent upon itself to provide a slot-engaging pin 26 which is normally carried within the slot 15. As will be observed, the crank 25 is disposed near the base plate 9 so that manual engagement therewith may be readily effected. It will be seen that as a line is being cast the fisherman may, instead of thumbing the reel in the usual manner, engage the crank 25 and rock it forwardly. This will slide the pin 26 in the slot 15 and will rock the plate 13 away from the center of the end wall 6 and will thereby disengage or unmesh the gear 19 from the pinion 12. Carried on the pivot 13' is a sleeve 27 and associated with the plate 13 and the pin 26 is a preferably wire spring 28 having one end portion engaged about the sleeve and the opposite end portion thereof engaged about the pin 26. It will be seen that after pressure is released from the crank 25, the spring 28 will return the plate to its former position and will mesh the gear 19 with the pinion 12.

Mounted on the end wall 6, near the periphery thereof and near the crank 25, is a stud 29 and rotatable on said stud is a lock 30 which is provided with a flat circular portion 31 and a straight portion 32 which is bent upon itself and then bent upwardly to provide a tongue 33 which overhangs the stud 29 and is engaged with the inner surface of the cover 22. The tongue 33 will maintain the lock flat against the bottom wall 6 and will thereby prevent upward displacement. The tongue 33 will not only maintain the lock flat against the bottom wall 6 but the tension of said tongue against the bottom surface of the cover will prevent accidental rotation of the lock. It will be seen that danger of the lock becoming engaged when not desired will be prevented. As best seen in Figure 3 of the drawing, the straight portion of the lock is provided at the point where it is bent upon itself with a straight edge 34 which is adapted to engage the straight wall of the plate 13 opposite the lug 14 and, when in engagement therewith, the lock will prevent rocking of the plate 13 away from the pinion 12. It is obvious, therefore, that when the device is in locked position the crank may not be rocked and the spool will be maintained in continuous engagement with the handle 21. The lock 30 is provided at one end of its circular portion with a lug 35 which is adapted to coact with the side wall of the cover 22 at a point adjacent a cut away portion in said side wall which is adapted to receive the edge of the curved portion therethrough. The lug 35 will prevent continuous rotation of the lock 30 and will provide a stop for the lock when in unlocked position. The lock 30 is provided with serrations 36 which will permit ready manual engagement therewith.

In use, a fishing line is first passed through the opening 11 in the spool and the line is then wound upon the spool in the conventional manner by rotating the handle 21. After the line has been wound upon the spool and the hook is baited, the line is cast, and, as the fisherman casts the line, he rocks the crank 25 forwardly with his thumb and thereby disengages the gear 19 from the pinion 12 as the plate 13 carrying said gear 19 is shifted away from the pinion 12. The spool is then allowed to rotate freely and the line will be paid out to the desired length. After the bait has reached the water, the pressure upon the crank 25 is released and the gear 19 will again be engaged with the pinion 12 for connecting the handle with the spool.

It is to be understood, of course, that the reel frame is provided at the end opposite from the mechanism hereinbefore described with a ratchet and pawl arrangement which is of conventional construction. It is also to be understood that, while I have described in more or less detail the use of a lock, if desired, the lock may be omitted so that the crank will always be capable of being rocked. However, inasmuch as I have employed the lock, the reel may be used in the conventional manner whenever desired.

It is believed that, from the foregoing description, it will be seen that I have provided a simple and highly efficient fishing reel which will be inexpensive in manufacture.

Having thus described the invention, I claim:

1. A fishing reel including a reel frame having end walls, a spool rotatable in said frame, a plate overlying one of said end walls and movable thereon, a gear carried on said plate, a pinion carried on one end of said spool adjacent the end wall carrying the plate, said plate being provided with a slot, a cover overlying the plate, gear and pinion, a crank carried by the frame and provided with a pin engaging in the slot, said crank being shiftable for rocking the plate away from the pinion for disengaging the gear from said pinion and permitting independent rotation of the spool, and a lock overlying one of the end walls and having a portion projecting from the circumferential edge thereof, said lock having a straight portion bent upon itself and terminating in a tongue resting against the inner side of the cover whereby said lock will be maintained in a rotatable position on said end wall, said lock being adapted for locking the handle and spool to rotate simultaneously.

2. A fishing reel including a reel frame having an end wall, a spool rotatable in the frame, a plate overlying the end wall and provided with an upstanding lug, said plate being shiftable on said end wall, a gear carried on the plate, a pinion carried on the spool and engageable with said gear, means engageable for rocking the plate and gear away from the pinion for permitting independent rotation of the spool, and a cover overlying the plate, gear and pinion and having its lower surface engageable by the lug, said lug providing a central support for said cover and cooperating with the cover for maintaining the plate in overlying relation to the end wall whereby wobbling of the plate on said wall will be prevented.

3. A device of the class described including a reel frame having an end wall, a spool rotatable in the end wall and having an end portion extending through said wall, a pinion on said end portion, a plate on the end wall and shiftable toward or away from said pinion, a gear mounted on the plate and engageable with the pinion, means engaging the plate and shiftable for moving said plate and gear away from the pinion for permitting intermittent independent rotation of the spool, and a lock on the end wall and having a circular portion and a straight portion, said straight portion being engageable with the plate and said curved portion being manually engageable for rotating the lock and engaging the straight portion with the plate for locking the plate with the gear in mesh with the pinion.

4. A device of the class described including a reel frame having an end wall, a spool carried in the frame and provided with a pinion, a plate overlying the end wall and shiftable thereon, a gear rotatable on the plate, means for shifting the plate away from the pinion for disengaging the gear from said pinion to permit independent rotation of the spool, means for shifting the plate to mesh the gear with the pinion, a cover overlying the plate, gear and pinion, and a lock overlying the end wall and having a straight portion engageable with the plate for locking the gear in mesh with the pinion, said straight portion being extended and bent upwardly to provide a tongue engaging the cover whereby the lock will be limited against accidental rotation and upward displacement.

5. A fishing reel including a frame having an end wall, a spool rotatable therein, a plate shiftably mounted on said wall, a gear on said plate, a pinion on the spool, a crank carried on the frame and having an end portion projecting through the end wall and being bent for engagement with the plate, said crank being adapted for imparting shifting movement to the plate for permitting intermittent meshing of the gear and pinion, means for rotating the gear, and manually engageable means projecting from the plate adjacent thereto and adapted for locking the gear and pinion in meshing relation.

6. A fishing reel including a frame, a spool rotatable therein, a handle on the frame, a lock carried on the frame and having a flat circular portion projecting from the frame and a straight portion, a plate shiftable on the frame, and means on the plate and spool for transmitting rotative movement from the handle to said spool, said lock being rotatable for engaging said straight portion with the plate and preventing relative shifting movement between the handle and spool.

7. A fishing reel including a reel frame having an end wall, a spool rotatable in the frame, a plate pivotally mounted on the end wall, a gear carried by the plate, a handle mounted on the gear, a pinion carried on the spool and disposed to mesh with the gear, said plate having a lug, a cover overlying the gear, pinion and plate and being centrally supported by said lug, a crank, a pin formed thereon and adapted to engage with the plate, and a lock carried on the end wall and having a circular portion terminating in a lug, said lock also being formed with a straight portion adapted to engage an edge of the plate for preventing shifting movement of the plate, said last mentioned lug preventing complete rotation of the lock and said plate being shiftable for freeing the gear and handle from the pinion when the lock is in unlocked position.

EDWARD G. WEAVER. [L. S.]